United States Patent

[11] 3,630,249

| [72] | Inventor | Elizabeth C. Brunwin<br>At Water Branch, 3517 Dover St., Los Angeles, Calif. 90039 |
|---|---|---|
| [21] | Appl. No. | 13,065 |
| [22] | Filed | Feb. 20, 1970 |
| [45] | Patented | Dec. 28, 1971 |

[54] CHOPPER CONSTRUCTION
2 Claims, 3 Drawing Figs.

[52] U.S. Cl.................................................. 146/203,
30/305
[51] Int. Cl.............................................. A47j 43/28,
B26b 3/04
[50] Field of Search............................................ 30/305;
146/203, 204, 160, 214

[56] References Cited
UNITED STATES PATENTS

| 2,258,387 | 10/1941 | Klumb........................ | 30/305 |
| 2,091,754 | 8/1937 | Fedje.......................... | 146/213 UX |
| 375,483 | 12/1887 | Foster......................... | 30/305 |
| 1,495,211 | 5/1924 | Smolk.......................... | 30/305 |

*Primary Examiner*—Willie G. Abercrombie
*Attorney*—Birch and Birch

ABSTRACT: A twin blade chopper formed from a single piece of sheet metal with a handle and a shank, said shank being looped or reeved diametrically in a groove in the handle. The shank flows back from the diametrical groove in contiguous relation to spotwelds on a bright or saddle of the twin chopper blades. The outboard sides of the blades are chamfered to provide cutting edges and the ends of the chopper blades are open and rounded to permit the chopper to rock, if desired.

PATENTED DEC 28 1971  3,630,249
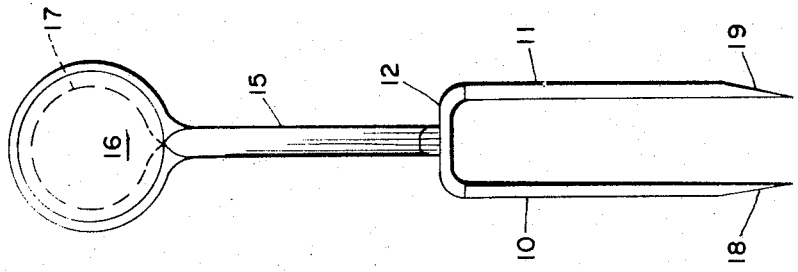
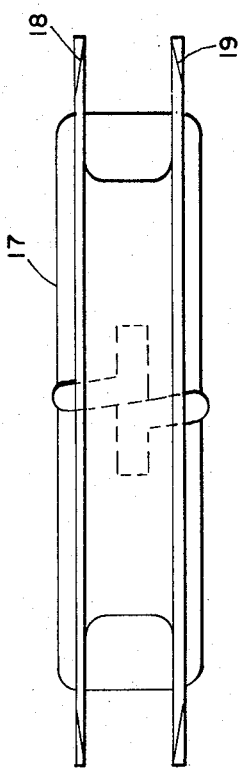
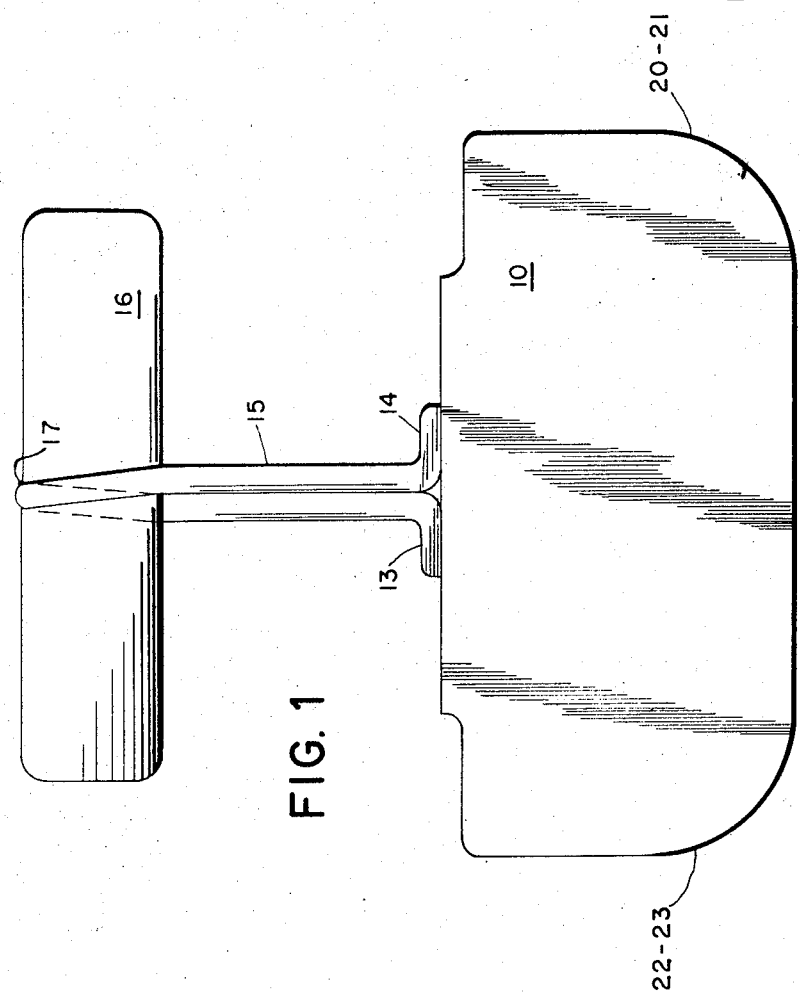
INVENTOR
ELIZABETH C. BRUNWIN
BY  *Birch + Birch*
ATTORNEY

CHOPPER CONSTRUCTION

The present invention relates to a twin blade chopper with a handle and shank.

The twin blades are made from a single piece of sheet metal and the blades are spaced in parallel relation with outboard chamfered edges to provide cutting edges.

An object of the invention is to provide a U-shaped twin blade with chamfered edges on the posterior or outboard side of each blade and with inboard sides of the respective blades; said blades, during the chopping action, tending to throw laterally outwardly away from the chamfered edges.

Another object of the invention is to provide a twin blade chopper with a handle and shank, said shank being wrapped diametrically about the middle of the handle, and the feet of the shank being spotwelded along the bight of the U-shaped blades and the shank being countersunk in a groove diametrically formed around the handle to provide a substantially flush surface.

With these and other objects in view, the invention consists in the construction, arrangement and combination of parts hereinafter described and particularly pointed out in the appended claims.

In the drawing like parts throughout the several views are given like numerals and are thus identified in the following description:

FIG. 1 is a side-elevational view of my complete invention;

FIG. 2 is an end-elevational view of FIG. 1, and

FIG. 3 is a bottom plan view of my twin blade chopper looking upwardly through and between the twin blades.

The present invention comprises a pair of blades 10 and 11 made from one sheet of metal. These blades are formed of two blades bent to provide parallel legs in the form of a U-shaped chopper head with a saddle or bight 12.

The saddle or bight 12 of the chopper blades is spot-welded to feet 13 and 14 of a double shank 15, which is wrapped about a handle 16. The handle 16 is formed intermediate with a diametrical groove 17 and the shank loops or wraps about the handle 16 in the groove and flows back in contiguous two-ply relation to saddle 12.

The blades 10 and 11 are formed on their posterior or outboard sides with chamfered edges 18 and 19 to provide cutting edges. During the chopping act of nuts, food, vegetables, and the like, the cutting chamfered edges throw the nuts, food, vegetables, and the like, outwardly, away from the lateral sides of the blades.

This serves to clear the lateral outboard sides of the blades and the inboard blade edges chopping action cuts straight down through the chopped material.

The blades are made in one piece of sheet metal bent U-shaped. The blades are made so as to be open at each end. Also, the respective edges of each of the blades 10 and 11 are rounded at 20 and 21 and 22 and 23.

By having the ends of the blades rounded, the chopper blades are allowed to rock, if desired.

The bight or saddle 12 has the handle 16 in parallel spaced relation by the shank 16 and is held in such parallel spaced relation that it may be grasped for use.

The manufacture of the chopper is very economical because the twin blades are made from a single metal sheet and the shank 15 is wrapped or looped around the handle 16 in a diametrical groove 17. Thus there are only three parts to the chopper, namely, the twin blades 10 and 11, the two-ply shank 15 and the handle 16.

Thus there is provided a chopper comprised of an economical and simple to operate chopper means. The said outboard chamfered edges of the blades laterally tend to throw the material outwardly from the blade with each chopping and cutting action.

Although only one embodiment of the invention has been illustrated and described, it is to be expressly understood that the invention is not limited thereto and various changes may be made in specific parts and arrangements and combinations thereof without departing from the spirit and scope of the invention. For a definition of the limits of the invention, reference should be had to the appended claims.

1. A twin blade chopper with a handle comprising blades formed from a single piece of sheet metal in substantially parallel spaced relation and joined together at their midsection by a bight section, said blades being open with cutting edges at each end, said blades having each cutting edge rounded, and the outboard sides chamfered, whereby rocking action is permitted during the chopping action, if desired, and a shank connected between said bight section and said handle, said shank having foot portions outwardly directed therefrom and secured to said bight section.

2. A twin blade chopper comprising spaced substantially parallel chopper blades formed from a U-shaped sheet, a relatively small central bight section at the bridge of the U-shaped sheet joining said larger chopper blades in spaced relation, whereby each of said blades project substantially beyond the opposite edges of said relatively small central bight section, a handle and an elongated shank formed of a continuous rigid rod, said handle being formed with a diametrical groove intermediate the ends of the handle, said shank being looped around the handle in the said intermediate groove and extending from the handle in elongated two-ply relation into supporting contact with the said central bight section joining the chopper blades, and attaching feet formed from each distal end of the shank secured to said bight section, said respective blades having inboard and outboard sides, said outboard sides having chamfered cutting edges, to thereby throw chopped material outwardly from said blades with each chopping and cutting action.

* * * * *